US008431899B2

(12) United States Patent
Tatsuoka

(10) Patent No.: US 8,431,899 B2
(45) Date of Patent: Apr. 30, 2013

(54) PASSIVE INFRARED RAY SENSOR

(75) Inventor: Katsutoshi Tatsuoka, Otsu (JP)

(73) Assignee: Optex., Ltd., Shiga (JP)

( * ) Notice: Subject to any disclaimer, the term of this patent is extended or adjusted under 35 U.S.C. 154(b) by 134 days.

(21) Appl. No.: 13/176,796

(22) Filed: Jul. 6, 2011

(65) Prior Publication Data

US 2012/0006988 A1 Jan. 12, 2012

(30) Foreign Application Priority Data

Jul. 7, 2010 (JP) ................................ 2010-154596

(51) Int. Cl.
*G01J 5/00* (2006.01)

(52) U.S. Cl.
USPC .................................... 250/338.1; 250/338.3

(58) Field of Classification Search ............... 250/338.1, 250/338.3
See application file for complete search history.

(56) References Cited

U.S. PATENT DOCUMENTS 4,825,079 A * 4/1989 Takamatsu et al. ........ 250/338.3
5,134,292 A 7/1992 Segawa et al.
5,291,020 A * 3/1994 Lee ............................... 250/342
6,677,589 B2 1/2004 Hironaka et al.
2003/0047671 A1 3/2003 Hironaka et al.
2005/0040947 A1 2/2005 Buckley et al.
2006/0229032 A1* 10/2006 Ninomiya et al. .............. 455/82

FOREIGN PATENT DOCUMENTS

EP 1341139 A2 9/2003
JP 2002-156281 A 5/2002

OTHER PUBLICATIONS

Extended European Search Report dated Oct. 13, 2011 issued in corresponding European Patent Application No. 11172635.2.

* cited by examiner

*Primary Examiner* — David Porta
*Assistant Examiner* — Mindy Vu
(74) *Attorney, Agent, or Firm* — Sughrue Mion, PLLC

(57) ABSTRACT

A passive infrared ray sensor of the present invention includes a plurality of detecting elements 2 and 3 for detecting infrared rays of light emanating from an intruder H present in different detection areas A1 and A2 of a detection region A, and a detection processing unit 6 including a plurality of individual signal processing subunits 7A, 7B each operable to perform a signal processing subject to a detection signal fed from the respective detection element 2 or 3, whereby when the detection signal from at least one of the detecting elements 2 and 3 indicates a detection of a noise other than the intruder, the signal processing of such detecting element 2 or 3 is halted.

5 Claims, 4 Drawing Sheets

PASSIVE INFRARED RAY SENSOR

CROSS REFERENCE TO THE RELATED APPLICATION

This application is based on and claims Convention priority to Japanese patent application No. 2010-154596, filed on Jul. 7, 2010, the entire disclosure of which is herein incorporated by reference as a part of this application.

BACKGROUND OF THE INVENTION

1. Field of the Invention

The present invention relates to a passive infrared ray sensor for detecting an intruder upon receipt of infrared rays of light emanating from a person intruding into a detection region.

2. Description of the Prior Art

In this type of the passive infrared ray sensor, infrared rays of light emanating from an intruder then entering in a detection region is collected by an optical element and then received by a detection element such as, for example, a pyroelectric element and a signal detecting process such as, for example, analysis of the waveform of a detection signal from the pyroelectric element, calculation and detection determination is carried out by a microcomputer (a detection processing unit) to thereby detect an intruder.

Since a signal detecting process performed by the microcomputer is generally operated with a rated electric current, the amount of an electric power consumed tends to be large and, hence, there has been such a problem that in the case of a detection sensor of a battery driven type, the lifetime of the battery tends to be reduced. Accordingly, the JP Laid-open Patent Publication No. 2002-156281, first published May 31, 2002, for example, discloses the use of a mode switching means for selecting one of an operating mode, in which the microcomputer performs the signal detecting process, and a standby mode, in which no signal detecting process is performed, such that during the stand-by mode the electric current is limited to a value lower than the rated electric current, in the event that a detection signal is lower than a activation threshold value which defines a standard at which the signal detecting process is initiated, but in the event that the detection signal is not lower than a activation threshold value, the microcomputer is operated under the operating mode.

In the meantime, in the case of the detection sensor of a type using two pyroelectric elements and operable to detect an intruder when signal levels of those detection signals from those pyroelectric elements are not all lower than a determination threshold value defining the reference for the intruder detection, when the detection signals of those two pyroelectric elements are stabilized at respective values lower than the activation threshold value, the microcomputer is set under the standby mode to thereby suppress the power consumption. In the event that the detection signal of either one of the pyroelectric elements is not lower than the activation threshold value, the microcomputer is set under the operating mode to analyze the detection signals of those pyroelectric elements so as to determine whether or not the detection signals of those two pyroelectric elements are not lower than the determination threshold value, thereby performing the signal detecting process.

In the case of the detection sensor utilizing the two pyroelectric elements, however, if the activation threshold value is lowered, in the event that in one of the pyroelectric elements, fluctuation of the detection signal occurs so frequently as to result in an instable condition because of noises induced by external environments such as, for example, trees or grasses within the detection area are swayed by the wind or heats of the sun or small animals run in and out, the signal from the pyroelectric element is analyzed each time the instable condition occurs enough to set the microcomputer under the operating mode and, therefore, reduction in electric power consumption cannot be achieved under the external environment full of noises, accompanied by reduction in battery lifetime. On the other hand, if the activation threshold value is increased, the difference between the activation threshold value and the determination threshold value is reduced and, depending on the detection signal, the waveform analysis may take place only with the waveform of peaks of the detection signal exceeding the activation threshold value and, therefore, no accurate signal pattern analysis may be carried out, accompanied by an erroneous recognition (erroneous warning) and/or a missing (failure to warn) of an intruder because of unavailability of the detection signal of a length required for the determination.

SUMMARY OF THE INVENTION

The present invention has been devised with a view to substantially eliminating the above discussed problems and inconveniences inherent in the prior art sensor and is intended to provide a passive infrared ray sensor capable of assuredly detecting an intruder while the electric power consumption is minimized particularly where a plurality of pyroelectric elements are used.

In order to accomplish the foregoing object, the present invention provides a passive infrared ray sensor which includes a plurality of detecting elements for detecting infrared rays of light emanating from an intruder present in different detection areas of a detection region; and a detection processing unit including a plurality of individual signal processing subunit each operable to perform a signal processing subject to a detection signal fed from the respective detection element, whereby when the detection signal from at least one of the detecting elements indicates a detection of a noise other than the intruder, the signal processing of such detecting element in the individual signal processing subunit is halted.

It is to be noted that the tern "noise" referred to hereinbefore and hereinafter is intended to means an instable detection signal caused by an external environment such as, for example, swaying of a tree, grasses or wash caused by the wind or heat of the sun within a detection region and a small animal running in and out of the detection region.

According to the present invention, since when the detection signal of at least one of the plural detecting elements indicates a detection of the noise, a signal processing of such detection signal is individually halted, even under the external environment full of noises within the detection region, no signal processing is effected on the detection element, which has provides the instable detection signal, and, also, no signal processing is carried out unless the remaining detecting elements, which are stable with less noses, detect the presence of the intruder, the detection processing unit as a whole does not perform the signal processing due to the detection of the noise, resulting in a reduction in an electric power consumption of the system as a whole.

In a preferred embodiment of the present invention, the detection processing unit may include a mode setting circuit for setting each of the individual signal processing subunits selectively to one of ordinary and halt modes, in which case each of the individual signal processing subunits includes a trigger circuit for performing a detection of the intruder or noise, based on the detection signal from the associated detecting element, and then triggering such individual signal processing subunit when the intruder is detected, but disabling such individual signal processing subunit when the noise is detected, and a signal analyzing circuit for analyzing the detection signal from the associated detecting element when such individual signal processing subunit is set to the ordinary mode. This is particularly advantageous in that since even under the external environment full of the noises within the detection region, the individual signal processing subunit associated with the detecting element having detected the noise is set to the halt mode, but the individual signal processing subunit is set to the ordinary mode when the intruder is detected subsequently, particularly where the plural detecting elements are employed, reduction of the electric power consumption can be accomplished and, at the same time, the intruder can be assuredly detected.

In another preferred embodiment of the present invention, when the individual signal processing subunit of either one of the detecting elements detects the intruder during the ordinary mode, the remaining individual signal processing subunits of the other detecting elements may be set to the ordinary mode to enable the detection signal to be analyzed and the detection processing unit may determine the presence of the intruder and then outputs when the detection signal from all of the detecting elements indicate a detection of the intruder. According to this feature, where the plural detecting elements are employed, even under the external environment full of noises within any detection region, since the detection processing unit is held under the stand-by mode, until either one of the individual signal processing subunits detect the intruder in the detection region, reduction of the electric power consumption can be accomplished and, at the same time, the intruder can be assuredly detected.

In a further preferred embodiment of the present invention, the trigger circuit may operate to detect the noise when the frequency of the detection signal from each of the detecting elements exceeding a trigger threshold value is within a predetermined range. In this case, even when the trigger threshold value is reduced, detection can be easily accomplished at a frequency exceeding the trigger threshold value, the operating time of the detection processing unit can be reduced, allowing the electric power consumption to be lowered accordingly. Also, each of the individual signal processing subunits referred to previously may be, when the absence of the noise continues for a predetermined length of time subsequent to the detection of the noise, automatically switched from the halt mode to the ordinary mode. In the event of the absence of the noise, there is no fear that the electric power consumption will increase even when it is not set to the halt mode and the intruder can be quickly detected under the ordinary mode.

Attention is called that any combination of two constructions disclosed in the appended claims and/or the specification and/or the accompanying drawings should be construed as encompassed within the spirit of the present invention, particularly within a combination of two or more of the appended claims.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DETAILED DESCRIPTION OF THE EMBODIMENTS

Figure 1:
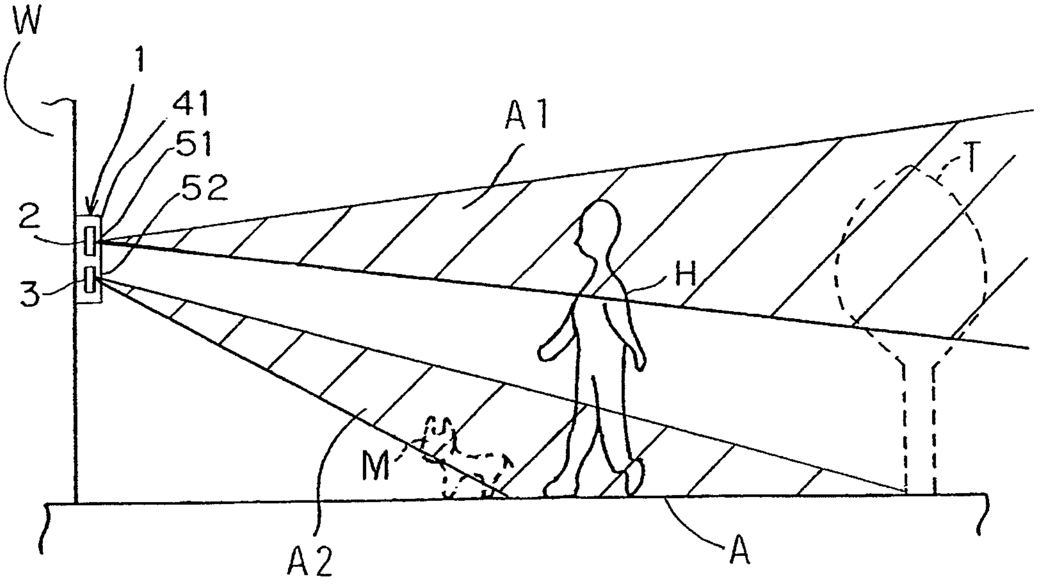
FIG. 1 is a schematic side view showing how a passive infrared ray sensor designed in accordance with a preferred embodiment of the present invention is installed.

Hereinafter, a preferred embodiment of the present invention will be described in detail with reference to the accompanying drawings. In particular, FIG. 1 illustrates, in a schematic side view, how a passive infrared ray sensor designed in accordance with the preferred embodiment of the present invention is installed. The illustrated infrared sensor 1 is of a type mainly secured to, for example, an outer wall surface W of a building such as, for example, a factory or a resident house for detecting an unauthorized intruder entering an outdoor detection region outside the building.

This infrared sensor 1 makes use of a plurality of detecting elements such as, for example, pyroelectric elements accommodated within a sensor unit 41. In the illustrated instance, two, first and second pyroelectric elements 2 and 3, both accommodated within a single sensor unit 41. The sensor unit 41 has optical systems 51 and 52 such as, for example, Fresnel lenses, equal in number to the pyroelectric elements 2 and 3 employed and positioned in front of the first and second pyroelectric elements 2 and 3. Those optical systems 51 and 52 are so supported and so positioned as to enable the first and second pyroelectric elements 2 and 3 to aim at and cover respective far and near detection areas A1 and A2, which are defined within the detection region A and are assigned respective localities relatively far away from and relatively near to the site of installation of the infrared sensor 1, that is, the outer wall surface W in the instance as shown. Specifically, where the first and second pyroelectric elements 2 and 3 are vertically positioned one above the other such as shown, the first pyroelectric element 2 assigned to monitor the far detection area A1 is generally oriented almost horizontally whereas the second pyroelectric element 3 assigned to monitor the near detection area A2 is generally oriented diagonally downwards.

Infrared energies emanating from a human body H, a small animal M, and so on, of entering in one or both of the far and near detection areas A1 and A2 impinge upon one or both of the first and second pyroelectric elements 2 and 3 after having been condensed by the associated optical systems 51 and 52. Those first and second pyroelectric elements 2 and 3, upon sensing those infrared energies, output respective detection signals indicative of the detection of the human body H or small animal M, which detection signals are subsequently processed to detect an intruding object, for example, the human body H in the instance as shown.

Other than the detection signal indicative of the human body H, there may be available noise signals such as a detection signal indicative of trees T (shown by the phantom line in FIG. 1) and/or washes being dried, which are then swinging by the wind or heat of the sun within the far detection area A1 and/or a detection signal indicative of a small animal M (also shown by the phantom line) such as, for example, a pet and/or grasses swaying within the near detection area A2.

Figure 2:
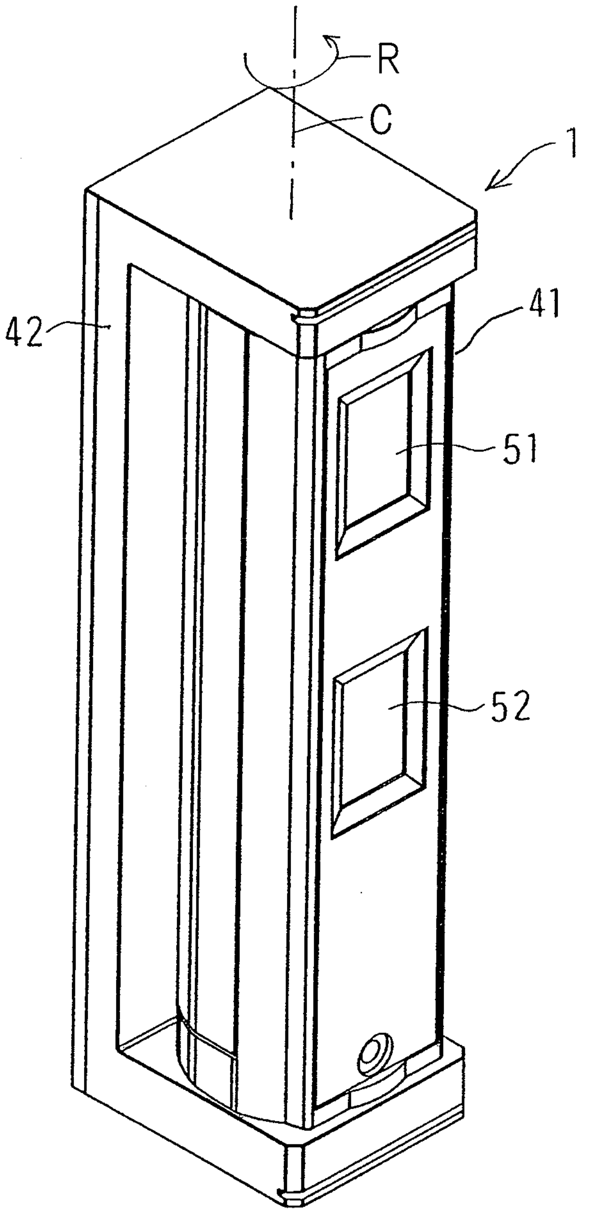
FIG. 2 is a schematic perspective view showing an external appearance of the passive infrared ray sensor.

Referring now to FIG. 2, the external appearance of the infrared sensor 1 is shown in a schematic perspective view. As shown therein, the infrared sensor 1 includes a generally U-shaped support frame 42 secured to the outer wall surface W. The sensor unit 41 referred to above is supported by the U-shaped support frame 42 for pivotal movement about a pivot axis C in between a leftwardly oriented position and a rightwardly oriented position past a neutral position in a direction, as indicated by R. The angle of pivot of the sensor unit 41 from the neutral position to any one of the leftwardly and rightwardly oriented positions may be, for example, 95° about the pivot axis C of the sensor unit 41. By so installing the sensor unit 41 on the support frame 42, the orientation of the sensor unit 41 in a direction forwards, leftwards or rightwards about the pivot axis thereof can be easily adjusted as desired with no need to alter the position of the infrared sensor 1 relative to the outer wall surface W.

Figure 3:
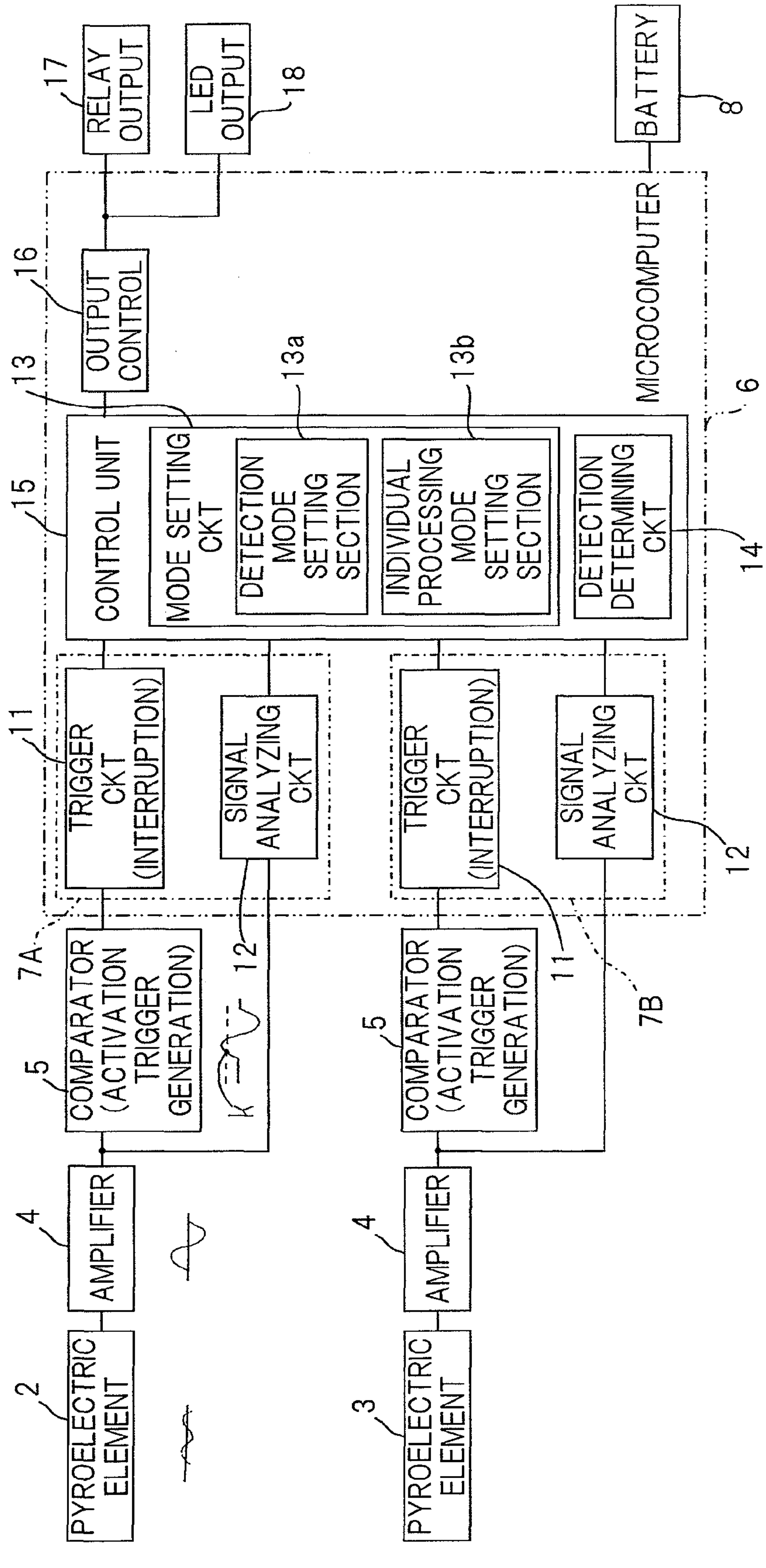
FIG. 3 is a circuit block diagram showing the structure of the passive infrared ray sensor.

FIG. 3 illustrates a circuit block diagram showing an electric circuit system employed in the passive infrared ray sensor 1 of the kind discussed hereinabove. The infrared sensor 1 includes, in addition to the first and second pyroelectric elements 2 and 3 referred to previously, first and second amplifiers 4 for amplifying respective outputs from the pyroelectric elements 2 and 3, first and second comparators 5 each operable to compare the level of the corresponding output from the pyroelectric element 2 or 3, which has been amplified by the associated amplifier 4, with a predetermined activation threshold value and then to outputs an activation trigger signal k in the event that the level of the amplified output of the pyroelectric element 2 or 3 exceeds the predetermined activation threshold value, and a detection processing unit (in the form of, for example, a microcomputer) for determining the presence or absence of an intruder into the detection region A on the basis of the trigger signals k fed respectively from the comparators 5.

The infrared sensor 1 is of a type powered by a replaceable electric power source such as, for example, at least one battery of a kind, which can be installed outdoor, and does therefore accommodate the battery 8 therein.

The detection processing unit 6 includes individual signal processing subunits 7A and 7B each operable to performs a signal processing based on the detection signal from the respective pyroelectric element 2 or 3, a control subunit 15 made up of a mode setting circuit 13 and a detection determining circuit 14, and an output control subunit 16. The detection processing unit 6 is so designed and so configured that when both of detection signals from the individual signal processing subunits 7A and 7B indicate a detection of an intruder in the detection region A, the presence of the intruder in the detection region A can be determined and, then, an output signal indicative of the presence of the intruder in the detection region A can be generated therefrom. Each of the individual signal processing subunits 7A and 7B makes use of a trigger circuit (trigger determination circuit) 11 and a signal analyzing circuit 12.

The mode setting circuit 13 in the control subunit 15 includes a detection mode setting section 13*a* and an individual processing mode setting section 13*b*. The detection mode setting section 13*a* is operable to set the detection processing unit (microcomputer) 6 selectively to one of an operating mode, under which the detection processing unit 6 performs a detected signal processing operation, and a stand-by mode under which the detection processing unit 6 is held in a stand-by condition without performing the detected signal processing operation. In addition, regardless of the mode under which the detection processing unit 6 is set, the individual processing mode setting section 13*b* also sets each of the individual signal processing subunits 7A and 7B selectively to one of an ordinary mode, under which the respective individual signal processing subunit 7A or 7B performs its own operation, and a halt mode under which the respective individual signal processing subunit 7 ceases its own operation. In the event that interruption by the activation trigger signal k of a value higher than the activation threshold value set in the trigger circuit 11 as will be described later, the detection processing unit 6 is set to the operating mode. So long as the interruption by the activation trigger signal k is absent, the detection processing unit 6 is set to the stand-by mode at all times.

The trigger circuit 11 in each of the individual signal processing subunits 7A, 7B performs a detection of an intruder or noise based on the detection signal from the respective pyroelectric element 2 or 3 and then activates such individual signal processing subunit 7A or 7B (ordinary mode) in the event of detection of the intruder, but disables the individual signal processing subunit 7A or 7B (halt mode) in the event of a detection of noise. By way of example, firstly, the trigger circuit 11 triggers and sets the detection processing unit 6 to the operating mode in the event that an interruption made thereto by the activation trigger signal k of a value exceeding the activation threshold value which is fed from the respective comparator 5. Thereafter, the trigger circuit 11 counts the number of interruptions made by the activation trigger signal k and performs the detection of noise when the count (frequency of interruptions) indicates a value falling within a predetermined range, for example, n to m times per second. In this case, the associated individual signal processing subunit 7A or 7B is held under the halt mode by the mode setting circuit 13, but upon detection of the noise, the detection processing unit 6 shifts to the stand-by mode without maintaining the operating mode. On the other hand, if the interruption by the activation trigger signal k takes place sporadically, the mode setting circuit 13 sets the signal processing unit 7A or 7B, associated with each of the first and second pyroelectric elements 2 and 3, to the ordinary mode and the detection processing unit 6 to the operating mode to enable detection of the intruder by the detection determining circuit 14 in the detection processing unit 6. It is to be noted that with detection of the intruder and the noise may make simultaneous use of detection thereof based on the magnitude of the amplitude and the frequency of the detection signal resulting from the analysis occurring in signal analyzing circuits 12 as will be described later.

The signal analyzing circuits 12, each associated with one of the first and second pyroelectric elements 2 and 3, analyze the detection signals fed respectively from the corresponding pyroelectric elements 2 and 3 when the associated individual signal processing subunits 7A and 7B are set under the ordinary mode. By way of example, the detection of the intruder is carried out by the trigger circuit 11 and one of the individual signal processing subunits 7A and 7B is set under the ordinary mode, the other of the individual signal processing subunits 7A and 7B is switched from the stand-by mode to the ordinary mode and the respective detection signals from the first and second pyroelectric elements 2 and 3 are analyzed. In the signal analyzing circuit 12, the analysis takes place based on the frequency and the magnitude of the amplitude of the detection signal in such a way that if the frequency of the detection signal is low, the presence of the noise is analyzed whereas if the frequency is high, the presence of the intruder in the detection region A is analyzed.

In the individual signal processing subunit 7A receiving the detection signal from, for example, the first pyroelectric element 2 monitoring the far detection area A1, if the trigger circuit 11 detects a high frequency and the presence of noises by trees T (shown FIG. 1), such individual signal processing subunit 7A is set under the stand-by mode (sleep mode). At this time, the individual signal processing subunit 7B receiving the detection signal from the other of the pyroelectric elements, that is, the second pyroelectric element 3 is set under the ordinary mode (wake-up mode). In the event that the detection signal from the second pyroelectric element 3 is lower than the activation trigger threshold value, that is, no trigger signal k is generated, the associated individual signal processing subunit 7B, even though under the ordinary mode, does not perform the detection processing and, therefore, the detection processing unit 6 is held under the stand-by mode.

In the event that the second pyroelectric element 3 senses the presence of the intruder in the detection region A, the individual signal processing subunit 7A associated with the first pyroelectric element 2 is switched from the halt mode to the ordinary mode (wake-up mode). It is, however, to be noted that in the event that both of the individual signal processing subunits 7A and 7B detects the presence of the noise, they are set to the ordinary mode (wake-up mode) in order to avoid an erroneous alarming.

Also, in each of the individual signal processing subunits 7A, 7B, the status of the noise (increase or decrease of the noise) is regularly monitored and, when even though the individual signal processing subunit 7A is set to the halt mode as a result of the detection of the presence of the noise, the absence of the noise is subsequently maintained for a predetermined length of time, the halt mode is automatically switched over to the ordinary mode. In other words, the individual signal processing subunits 7A, 7B set to the halt mode are not specified and, depending on the environment of the site of the detection area A1 and/or change in weather and/or time zone, even in the case where the individual signal processing subunits 7A, 7B then detecting the presence of the noise changes, the individual signal processing subunits 7A, 7B then set to the halt mode are automatically selected and, therefore, the setting of the halt mode in each of the individual signal processing subunits 7A, 7B to meet with change in status of the noise can be performed optimally.

Under the condition in which interruption by the activation trigger signal k occurs in the trigger circuit 11 and the detection processing unit 6 is therefore set to the operating mode, the detection determining circuit 14 determines the presence of the intruder when based on the analysis by the signal analyzing circuits 12, all of the detection signals from the individual signal processing subunits 7A, 7B then set to the ordinary mode indicate the presence of the intruder. The output control subunit 16 referred to previously performs a control of outputting a determination output. The output of the output control subunit 16 may be used as a relay output 17 for generating a voice output or an output to an outer security center, and an LED output 18 for warning.

The infrared sensor 1 according to the present invention performs a series of detection procedures based on a software program, stored in the control unit 15, and the previously described construction within the detection processing unit 6.

Figure 4:
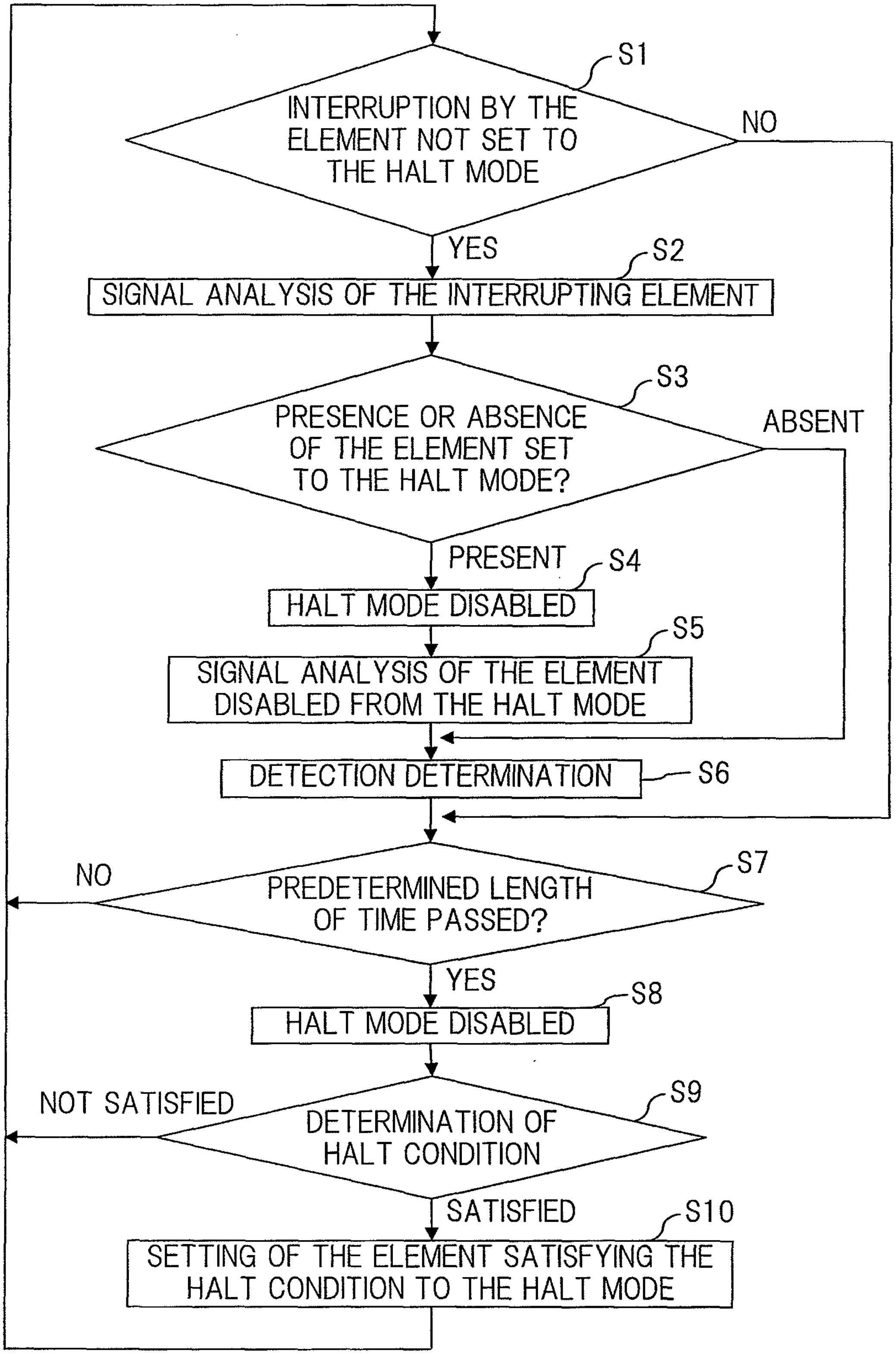
FIG. 4 is a flowchart showing the sequence of operation of the passive infrared ray sensor.

FIG. 4 illustrates the flowchart showing the sequence of operation of the infrared sensor of the present invention. In the event that as shown in FIG. 1 the noise, which indicates the presence of the swaying tree T within the detection area A1 or the small animal M running in and out within the detection area A2, is detected, the individual signal processing subunits 7A and 7B associated respectively with the pyroelectric elements 2 and 3 are set to the halt mode. In the instance as shown, since the small animal M is present within the detection area A2, the individual signal processing subunit 7B associated with the second pyroelectric element 3 is set to the halt mode.

In the first place, in the individual signal processing subunit 7A associated with the first pyroelectric element 2 and set to the ordinary mode, not the halt mode, in the detection area A1, whether or not interruption by the activation trigger signal k occur sporadically in the trigger circuit 11 (or the detection signal of a high frequency or a high amplitude is generated) is determined at step S1. In the event of the interruption taking place, the signal analysis of the detection signal from the first pyroelectric element 2, in which the interruption is generated, is carried out at step S2. In the event that no interruption takes place, the program flow goes to step S7. Then, if the presence or absence of the individual signal processing subunit 7B associated with the second pyroelectric element 3 and then set to the halt mode is confirmed at step S3, and in the event of the presence of the individual signal processing subunit 7B associated with the second pyroelectric element 3 then set to the halt mode, the halt mode is disabled at step S4. Absent the individual signal processing subunit 7B associated with the second pyroelectric element 3 set to the halt mode, the program flow goes to the detection determination at step S6.

Subsequently, the signal analysis of the detection signal from the second pyroelectric element 3, for which the halt mode is disabled at step S4, takes place at step S5. Immediately after the intruder, indicated by H, has been detected by the first pyroelectric element 2, the signal analysis of the detection signal from the second pyroelectric element 3 takes place. By the signal analysis of the two detection signals from the first and second pyroelectric elements 2 and 3, respectively, the presence of the intruder is determined at step S6. Thereafter, whether or not the predetermined length of time has passed is confirmed at step S7. This is carried out by disabling the halt mode each time the predetermined length of time passes to repeat the halt determination and then setting the halt mode if the condition full of noises lasts, but not setting the halt mode if the noises is reduced. By so doing, the individual signal processing subunit 7 does not assume the halt mode in correspondence with reduction of the noises resulting from a change in external environment.

In the event that the predetermined length of time has passed, the halt mode is disabled at step S8. Thereafter, a halt condition such as, for example, the frequency of interruption is determined at step S9 and, in the event that this halt condition is satisfied, the pyroelectric elements 2 and 3 satisfying the halt condition are set to the halt mode at step S10, followed by the program flow returning to step S1. On the other hand, in the event that no halt condition is satisfied, the program flow goes directly to step S1.

Since in the practice of the present invention, when the noise is detected in one detection area A2, the individual signal processing subunit 7B associated therewith is set to the halt mode and, on the other hand, when the noise is detected in other detection area A1, the individual signal processing subunit 7A is set to the ordinary mode, in the event that the intruder is detected, the detection processing unit 6 is set to the operating mode and the signal processing units 7A set to the halt mode is switched over to the ordinary mode and, hence, the intruder is determined by the detection of the intruder made by both of the individual signal processing subunits 7A, 7B. However, under the condition in which even though the noise has been detected, no intruder H is detected, the detection processing unit 6 as a whole maintains the stand-by mode, in which no signal detection processing take place, without shifting to the operating mode in which the signal detection processing takes place even by the detection of the noise. Where the detection processing unit 6 and the signal processing units 7A, 7B are respectively under the stand-by mode and the halt mode, reduction in electric power consumption down to a value, which is a fraction of a few hundreds to a fraction of a few thousands of those exhibited by the detection processing unit 6 and the individual signal processing subunits 7A, 7B then held respectively under the operating mode and the ordinary mode, can be exhibited and, therefore, the electric power consumption of the sensor system as a whole can be minimized to enable the battery 8 to be usable for a prolonged period of time.

As hereinabove described, since in the present invention, when the detection signal of at least one of the plural pyroelectric elements 2, 3 indicates the detection of the noise, the signal detection processing of such pyroelectric element in the individual signal processing subunit 7A or 7B can be halted, even under the external environment in which the detection region A is full of noises, no signal detection processing take place in the pyroelectric element 2 or 3 that has provided the instable detection signal and, at the same time, no signal detection processing take place in the pyroelectric element 3 or 2, that has provided the stable detection signal because of less noises, so long as the intruder is not detected, and, therefore, the detection processing unit 6 as a whole maintains the stand-by mode, in which no signal detection processing take place, without shifting to the operating mode, in which the signal detection processing take place even by the detection of the noise, thus making it possible to reduce the electric power consumption of the sensor system and also to assuredly detect the intruder.

Although in describing the foregoing embodiment of the present invention, reference has been made to the use of the two pyroelectric elements, three or more pyroelectric elements may be employed. In such case, not only can the capability of detecting the intruder be increased, but also two or more individual signal processing subunits can be set to the halt mode, and, therefore, reduction of the electric power consumption be further facilitated.

It is to be noted that although in the foregoing embodiment of the present invention, the passive infrared ray sensor 1 makes use of the battery 8 and is powered by an electric direct current from such battery, the present invention is not necessarily limited thereto and the infrared sensor of the present invention may be powered by the wired supply of an electric power through, for example, an electric connecting line from commercial electric power.

Also, although in the foregoing embodiment of the present invention, the trigger circuits 11 have been shown and described as used to detect the presence of the noise when the respective detection signals from the first and second pyroelectric elements 2 and 3 are of such a nature that the frequency, at which they exceed the activation threshold value is within a predetermined range, arrangement may be so made that when as a result of the analysis performed by the signal analyzing circuits 12, the frequency or the amplitude of the detection signals are low, the presence of the noise can be analyzed, but when the frequency or amplitude is high, the presence of the intruder can be detected. In such case, if the trigger circuit 11 shown in FIG. 3 recognizes the activation trigger signal k, the detection signal outputted from the amplifier 4 can be analyzed by the signal analyzing circuit 12 to thereby detect the presence of the noise or the intruder.

Although in the foregoing embodiment of the present invention the use has been made of the pyroelectric elements as the detecting elements, the present invention may not be necessarily limited thereto and the detection elements may be employed in the form of infrared radiation temperature sensors (thermo-piles) or infrared arrays.

Furthermore, although in the practice of the embodiment of the present invention, the detection elements has been described as used to detect the noises, the use may be made of a noise detecting means that can be regularly activated to detect the presence of the noise. For this noise detecting means, a microwave sensor, an ultrasonic sensor or a temperature sensor can be employed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

1 . . . Passive Infrared Ray Sensor
2, 3 . . . Pyroelectric Element
6 Microcomputer
7A, 7B . . . Individual Signal Processing Subunit
11 . . . Trigger Circuit (Interruption)
12 . . . Signal Analyzing Circuit
13 . . . Mode Setting Circuit
13*a* . . . Detection Mode Setting Section
13*b* . . . Individual Processing Mode Setting Section
14 . . . Detection Determining Circuit
15 . . . Control Unit
16 . . . Output Control
A . . . Detection Region
H . . . Intruder

What is claimed is:

1. A passive infrared ray sensor which comprises:

a plurality of detecting elements for detecting infrared rays of light emanating from an intruder present in different detection areas of a detection region; and a detection processing unit including a plurality of individual signal processing subunit each operable to perform a signal processing subject to a detection signal fed from the respective detection element;

wherein when the detection signal from at least one of the detecting elements indicates a detection of a noise other than the intruder, the signal processing of such detecting element in the individual signal processing subunit is halted.

2. The passive infrared ray sensor as claimed in claim 1, in which the detection processing unit includes a mode setting circuit for setting each of the individual signal processing subunits selectively to one of ordinary and halt modes and in which each of the individual signal processing subunits includes a trigger circuit for performing a detection of the intruder or noise, based on the detection signal from the associated detecting element, and then triggering such individual signal processing subunit when the intruder is detected, but disabling such individual signal processing subunit when the noise is detected, and a signal analyzing circuit for analyzing the detection signal from the associated detecting element when such individual signal processing subunit is set to the ordinary mode.

3. The passive infrared ray sensor as claimed in claim 2, in which when the individual signal processing subunit of either one of the detecting elements detects the intruder during the ordinary mode, the remaining individual signal processing subunits of the other detecting elements are set to the ordinary mode to enable the detection signal to be analyzed and in which the detection processing unit determines the presence of the intruder and then outputs when the detection signal from all of the detecting elements indicate a detection of the intruder.

4. The passive infrared ray sensor as claimed in claim 2, in which the trigger circuit operates to detect the noise when the frequency of the detection signal from each of the detecting elements exceeding a trigger threshold value is within a predetermined range.

5. The passive infrared ray sensor as claimed in claim 2, in which the individual signal processing subunit is, when the absence of the noise continues for a predetermined length of time subsequent to the detection of the noise, automatically switched from the halt mode to the ordinary mode.

* * * * *